United States Patent
Weir et al.

(12)

(10) Patent No.: US 6,422,537 B1
(45) Date of Patent: Jul. 23, 2002

(54) APPARATUS FOR STRINGING STATIC WIRE TO UTILITY POLES

(76) Inventors: Daryl W. Weir, 967 E. 137th St., Carbondale, KS (US) 66414; Steven M. Short, 2706 SW. Ashworth Pl., Topeka, KS (US) 66614

( * ) Notice: Subject to any disclaimer, the term of this patent is extended or adjusted under 35 U.S.C. 154(b) by 44 days.

(21) Appl. No.: 09/658,625

(22) Filed: Sep. 8, 2000

(51) Int. Cl.$^7$ .............................................. B65H 59/00
(52) U.S. Cl. ............................................. 254/134.3 PA
(58) Field of Search ............................... 254/134.3 PA, 254/134.3 R (56) References Cited

U.S. PATENT DOCUMENTS

| | | | |
|---|---|---|---|
| 3,975,580 A | | 8/1976 | Lewis |
| 4,015,073 A | | 3/1977 | Dickerson |
| 4,230,357 A | | 10/1980 | Bosch et al. |
| 4,312,495 A | * | 1/1982 | Dunbar ............... 254/134.3 PA |
| 4,641,727 A | | 2/1987 | McKelvy |
| 5,195,704 A | | 3/1993 | Louie |
| 5,533,710 A | * | 7/1996 | Sauber ............... 254/134.3 PA |

* cited by examiner

*Primary Examiner*—Robert C. Watson
(74) *Attorney, Agent, or Firm*—Mitchell L. Crain; Mark E. Brown (57) ABSTRACT

An apparatus and method are provided for stringing static wire to a utility pole. The apparatus comprises a body having a base portion and a pair of arms extending from the base portion in generally opposing directions. Each of the arms has a sleeve attached to its distal end, the sleeves having a generally vertical receiver and an upper bearing surface. Each sleeve receives a jackscrew, the jackscrews having a lower end with a flange sized and shaped so as to be receivable by a coupler of a standard stringing dolly. A nut is threaded on each jackscrew proximate its upper end and bears against the respective sleeve upper bearing surface. A jack handle is provided for turning the nuts and thereby raising and lowering the jackscrews. The apparatus further includes a crossbar retaining structure which is connected to the body base portion and is securable to a crossbar of a utility pole static bracket such that the distal ends of the arms are in alignment with the desired location for connecting the static wire to the crossbar. In use, the apparatus is secured to the static bracket crossbar by means of the crossbar retaining structure, and a pair of standard stringing dollies are connected to the jackscrew lower end flanges. A free end of the static wire is then pulled through the stringing dollies and through the gap between the upper extremity of the pole and the crossbar. The apparatus holds the static wire in place until it can be tensioned and permanently connected. After the wire is tensioned, the lineman uses the jack handle to turn the nuts and thereby raise the jackscrew lower ends and the attached static wire until it is the proper distance from the crossbar. The static wire is then connected to the crossbar in the usual manner.

24 Claims, 7 Drawing Sheets

APPARATUS FOR STRINGING STATIC WIRE TO UTILITY POLES

BACKGROUND OF THE INVENTION

1. Field of the Invention

The invention relates generally to the field of utility line installation equipment, and more particularly to an apparatus and method for simplifying the installation of static lines on the tops of utility poles.

2. Description of the Related Art

During installation and repair of utility transmission lines, it is often necessary to string a "static wire" or "shield wire" across the tops of the utility poles. The static wire is connected to the pole by means of a "static bracket" having a pair of vertical legs which are bolted to the pole near its upper end and extend upwardly past the top of the pole and a horizontal crossbar which is bolted to the upper extremities of the two legs. The static wire is suspended between the top of the pole and the crossbar by a "shoe" which clamps to the static wire and a clevis which connects the shoe to the crossbar.

Utility wires are strung by pulling them through a pulley or "stringing dolly" which is connected to the pole. The stringing dolly holds the wire in place until the wire can be permanently fastened to the pole. Installation of static wire is complicated by the fact that a standard stringing dolly is too large to fit into the space between the crossbar of the static bracket and the top of the pole. A common method of stringing static wire is to fasten the stringing dolly to the crossbar outside of one of the legs, and then to pull the wire through the stringing dolly and tighten it. The lineman must then loosen the bolts holding the crossbar to the legs and completely remove the bolt on the end of the crossbar opposite the dolly. He or she then pivots the crossbar about the remaining bolt, manually lifts the wire over the top of the static bracket, and works it down between the unbolted end of the crossbar and the respective leg until the wire rests on the top of the pole. The lineman then reassembles the static bracket, clamps the shoe to the wire, and then lifts the wire up toward the crossbar and pins the shoe to the clevis.

The previous installation method clearly involves unnecessary steps since the static bracket must be first be installed, then unbolted to insert the static wire, and then reassembled. Previous practice also requires unnecessary manual lifting; first to raise the wire from the stringing dolly over the top of the bracket, and then again to fasten the shoe to the crossbar. This unnecessary exertion on the part of the lineman results in fatigue and can cause physical injury. What is needed is a device which allows the static wire to be installed between the crossbar and the top of the pole without disassembling the static bracket or manually lifting the wire.

SUMMARY OF THE INVENTION

The present invention comprises a static wire stringing apparatus for use when stringing static wire to a utility pole, and a method of using the apparatus. The apparatus comprises a body having a base portion and a pair of arms extending from the base portion in generally opposing directions. Each of the arms has a sleeve attached to its distal end, the sleeves having a generally vertical receiver and an upper bearing surface. Each sleeve receives a jackscrew, the jackscrews having lower ends with flanges sized and shaped so as to be receivable by a coupler of a standard stringing dolly. A nut is threaded on each jackscrew proximate its upper end and bears against the respective sleeve upper bearing surface. A jack handle is provided for turning the nuts and thereby raising and lowering the jackscrews.

The apparatus further includes a crossbar retaining structure which is connected to the body base portion and is securable to a crossbar of a utility pole static bracket such that the distal ends of the arms are in alignment with the desired location for connecting the static wire to the crossbar.

In use, the apparatus is secured to the static bracket crossbar by means of the crossbar retaining structure, and a pair of standard stringing dollies are connected to the jackscrew lower end flanges. A free end of the static wire is then pulled through the stringing dollies and through the gap between the upper extremity of the pole and the crossbar. The apparatus holds the static wire in place until it can be tensioned and permanently connected. After the wire is tensioned, the lineman uses the jack handle to turn the nuts and thereby raise the jackscrew lower ends and the attached static wire until it is the proper distance from the crossbar. The static wire is then connected to the crossbar in the usual manner.

In order to remove the apparatus, the lineman uses the jack handle to turn the nuts and thereby lower the static wire until the dollies are no longer supporting it. The static wire is then released from the stringing dollies and the apparatus is removed from the crossbar.

OBJECTS AND ADVANTAGES OF THE INVENTION

The principal objects and advantages of the present invention include: providing an apparatus for stringing static wire on power poles; providing such an apparatus which allows the static line to be installed without disassembling the respective static bracket, providing such an apparatus which does not require the static line to be manually lifted into position by a lineman; providing such an apparatus which is lightweight; providing such an apparatus which works equally well in conventional and fiber optic applications; providing such an apparatus which gives a lineman adequate room to work while fastening the static line to its respective static bracket and providing such an apparatus which is economical to manufacture, efficient in operation, capable of a long operating life and particularly well-adapted for the proposed usage thereof.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof said terminology will include the words specifically mentioned; derivatives thereof and words of a similar import.

Referring to the drawings in more detail, the reference number 1 generally designates a static wire installation apparatus embodying the present invention. The apparatus 1 (shown in FIGS. 1–4) includes a body 3 which is formed of a strong, rigid material such as steel plate. The body 3 is generally T-shaped, having a pair of horizontal arms 5, and a central or base portion 7 which depends downwardly from the arms 5. Each of the arms 5 has a distal end 9, attached to which is a jackscrew sleeve 11 with a generally vertical receiver 13. The central portion 7 of the body 3 has a central slot 15 which extends upward from the lower extremity 17 of the body 3. The slot 15 is sized and shaped to receive a crossbar retaining structure 19.

The retaining structure 19 is comprised of a pair of side plates 21, each of which has a central aperture 23 which extends upwardly from a bottom edge 25 of the plate 21 to form an arch having a first leg 27, a cross piece 29, and a second leg 31. The side plates 21 are held in spaced relation to one another by a top piece 33 welded between the plate cross pieces 29 such that a crossbar receiving slot 35 is formed between the side plates 21. The first legs of the side plates 21 and a proximate end of the top piece 33 are inserted into the body central slot 15 and welded in place so that the retaining structure 19 extends outwardly from, and generally at a right angle to, the body 3.

The second legs 31 of the side plates 21 include aligned pin receivers 37 sized and shaped to receive a latching pin 39. A pin receiver extension sleeve 41 may be welded to one of the side plates 21 in alignment with the respective pin receiver 37. In order to prevent the latching pin 39 from being dropped or lost, it may be attached to the apparatus 1 by a chain 43.

The arms 5 of the body 3 are each bent at an angle such that the jackscrew sleeve receivers 13 are generally aligned with the centerline of the side plate apertures 23. Each of the jackscrew receivers 13 accepts a threaded jackscrew 45 having an upper end 47 and a lower end 49. The lower end 49 of each jackscrew 45 has a circular flange 51 formed thereon, the flange 51 being sized and shaped to be accepted by a latching coupler 53 of a standard stringing dolly 55. The jackscrew 45 may include a pin or stop 56 proximate the flange 51 which engages the latching coupler 53 and prevents the dolly 55 from turning relative to the jackscrew 45.

Each jackscrew 45 is held in place relative to the respective jackscrew sleeve 11 by a jack nut 57 which is threaded onto the jackscrew 45 via the upper end 47 thereof and bears against an upper end 59 of the sleeve 11.

The apparatus 1 further includes a jack handle 61 designed for use in turning the jack nuts 57 and thereby raising the lower ends 49 of the jackscrews 45 relative to the sleeves 11. The jack handle 61 includes a socket 63 sized and shaped to receive the jack nuts 57. The socket 61 is attached to an elongate bar 64 proximate a first end 65 thereof. The jack handle 61 may further include a spinner knob 67 rotatably connected to the bar 64 at a second end 68 opposite the socket 61.

Figure 6:
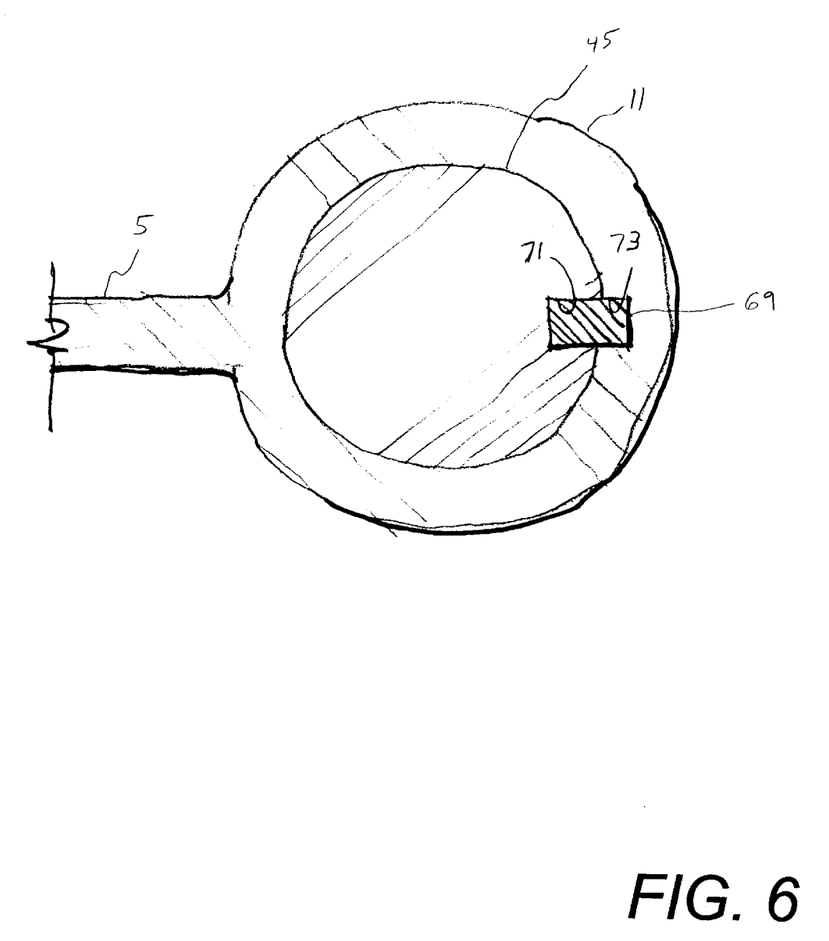
FIG. 6 is a cross-sectional view of a jackscrew and sleeve of the static wire stringing apparatus taken generally along line 6—6 in FIG. 5.

As shown in FIG. 6, each jackscrew 45 is preferably prevented from turning relative to the respective sleeve 11 while the jack nut 57 is being turned by a key 69 inserted into aligned vertical keyways 71, 73 in the jackscrew 45 and sleeve 11, respectively.

Figure 5:
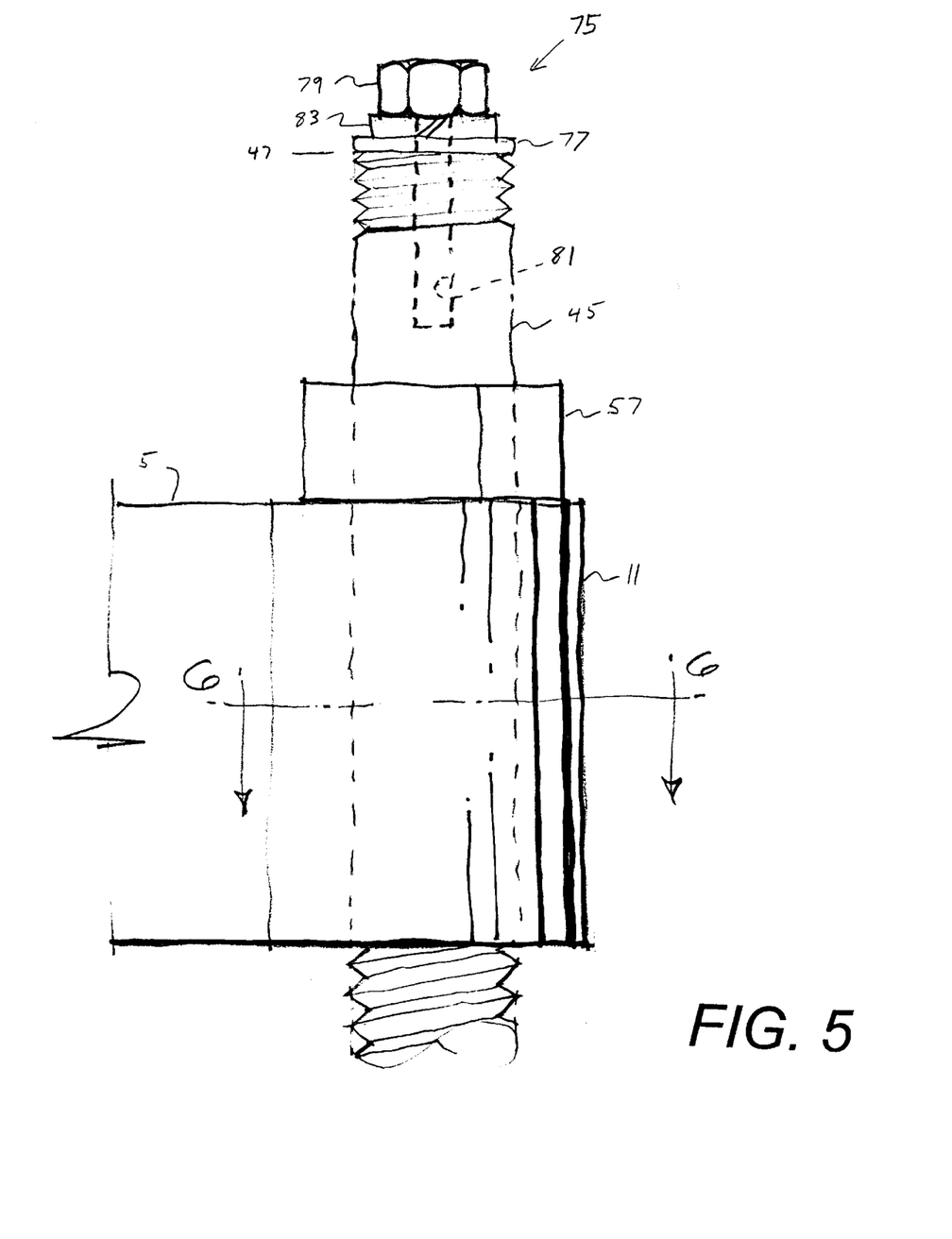
FIG. 5 is a partial side view of a jackscrew and sleeve of the static wire stringing apparatus equipped with an optional jackscrew stop.

The jackscrews 45 may each also be equipped with a jackscrew stop 75 (see FIG. 5) which prevents the respective jack nut 57 from inadvertently being unscrewed off the upper end 47 of the jackscrew 45. The stop 75 may comprise a retaining washer 77 having an outside diameter which is the same as the outside diameter of the jackscrew 45, and is thereby large enough to prevent the jack nut 57 from being removed from the jackscrew 45, but small enough not to interfere with the handle socket 63. The retaining washer 76 can be attached to the respective jackscrew 45 by an threaded fastener 79 received by a threaded axial receiver 81 in the upper end 47 of the jackscrew 45. A lock washer 83 retains the threaded fastener 79 in position.

Figures 7, 8:
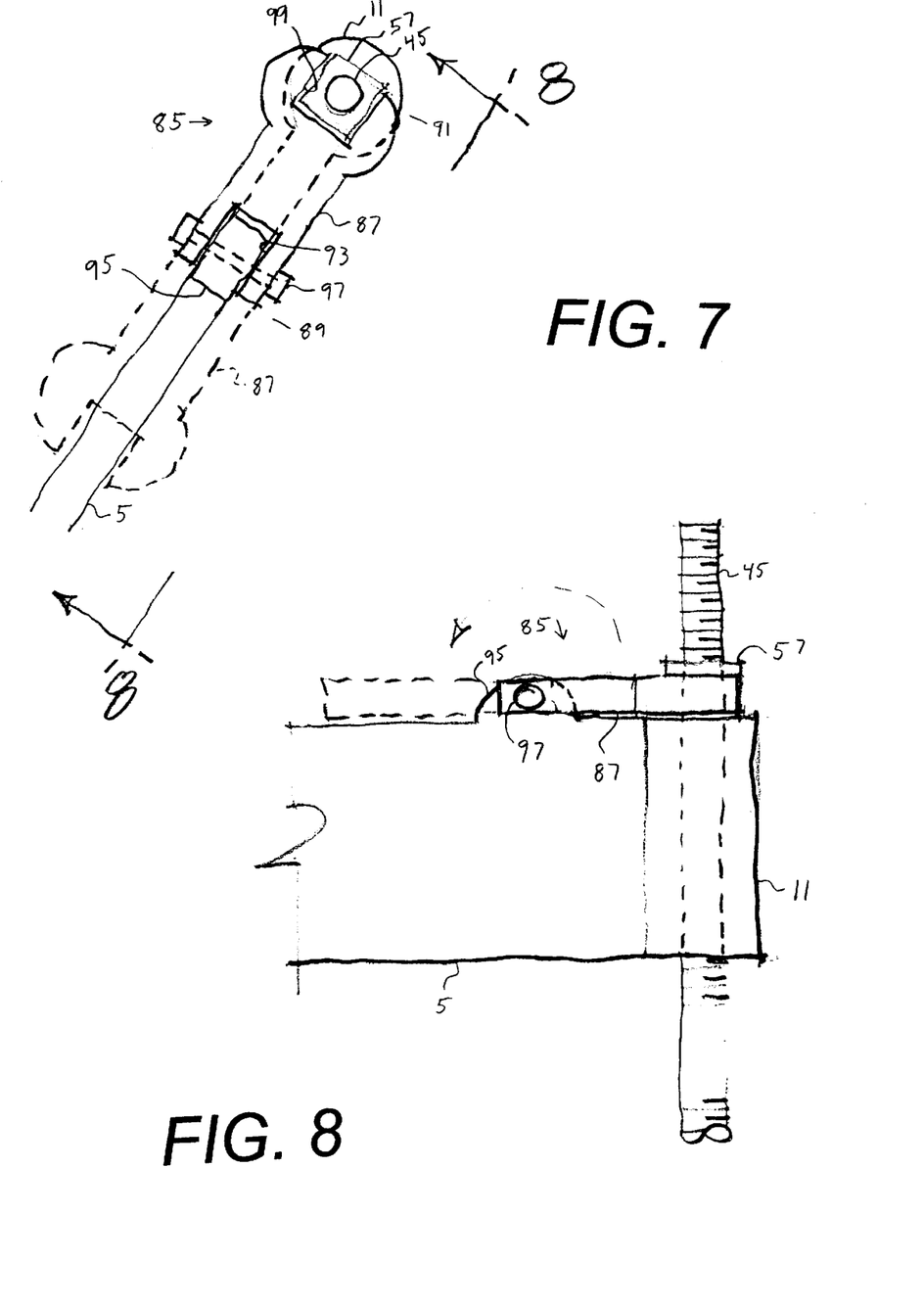
FIG. 7 is a partial top view of an arm of the static wire stringing apparatus equipped with an optional jackscrew nut lock
FIG. 8 is a partial side view of an arm of the static wire stringing apparatus equipped with an optional jackscrew nut lock taken generally along line 8—8 in FIG. 7.

Each arm 5 of the stringing apparatus 1 preferably includes a jack nut lock 85 (see FIGS. 7 and 8) which selectively prevents the respective jack nut 57 from turning once the respective jackscrew 45 has been raised or lowered to its desired position. The jack nut lock 85 comprises a locking member 87 which includes a first or hinge end 89 and a second or locking end 91. The hinge end 89 has a notch 93 sized and shaped to accept a lug 95 which protrudes upward from the arm 5. The locking member 87 is connected to the arm 5 by a pin or bolt 97 inserted through aligned receivers in the lug 95 and locking member 87. The locking end 91 has a notch 99 sized and shaped to accept the jack nut 57. The locking member 87 is selectively pivoted about the pin 97 between a locked position wherein the notch 99 engages the jack nut 57, and an unlocked position wherein the jack nut 57 is free to turn.

Figure 1:
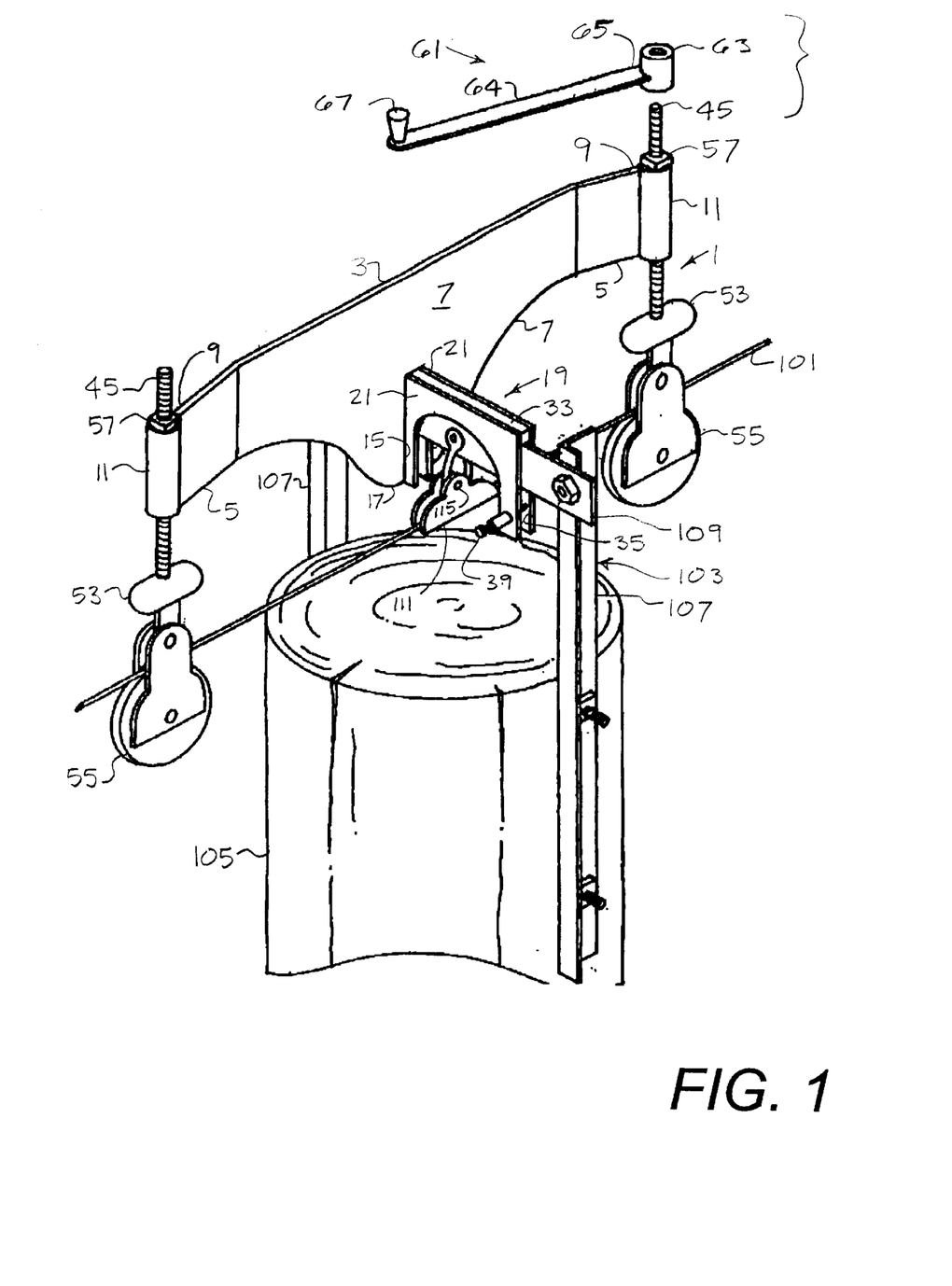
FIG. 1 is a perspective view of a static wire stringing apparatus embodying the present invention attached to the static bracket of a utility pole.
Figure 2:
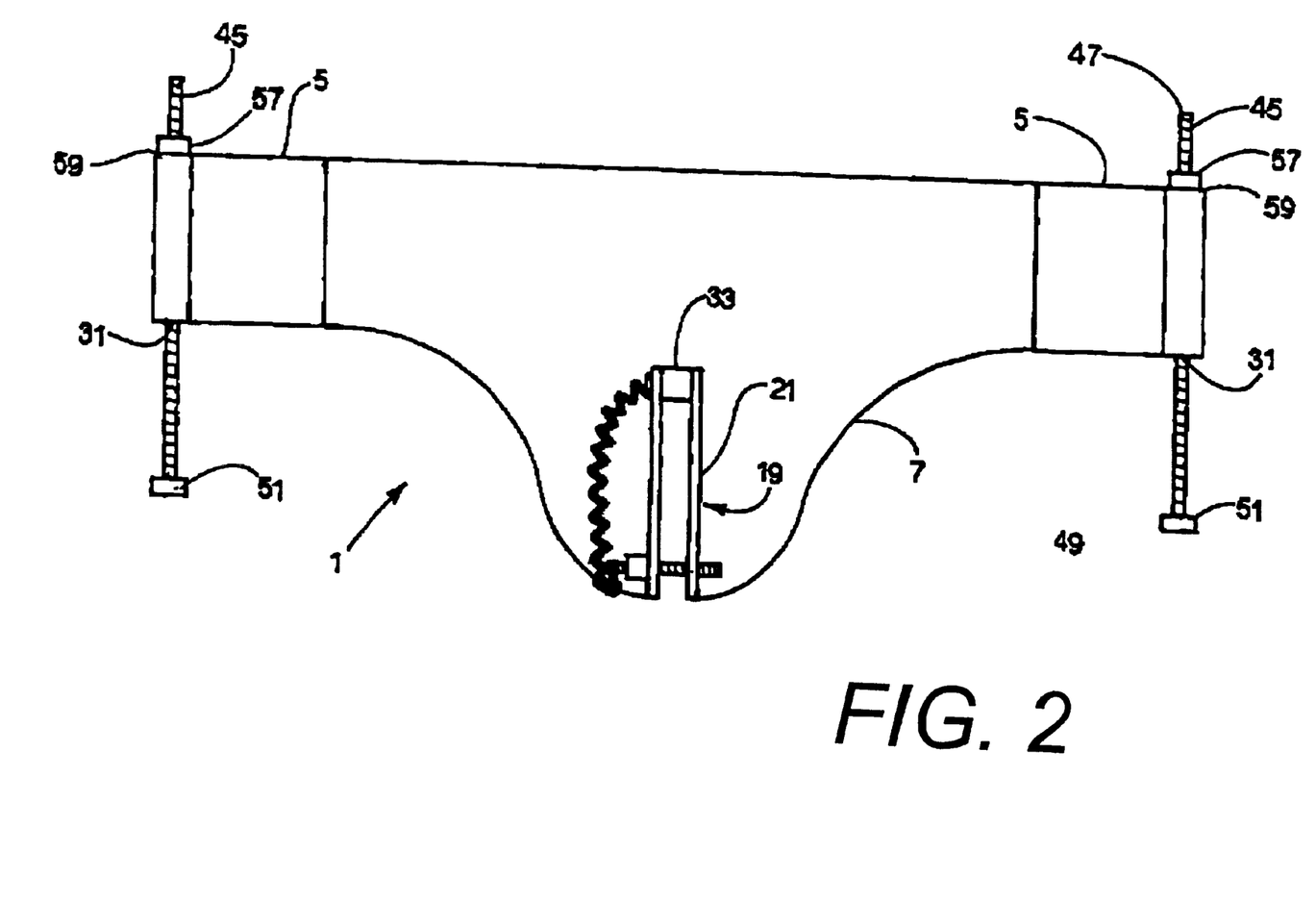
FIG. 2 is a side view of the static wire stringing apparatus.
Figure 3:
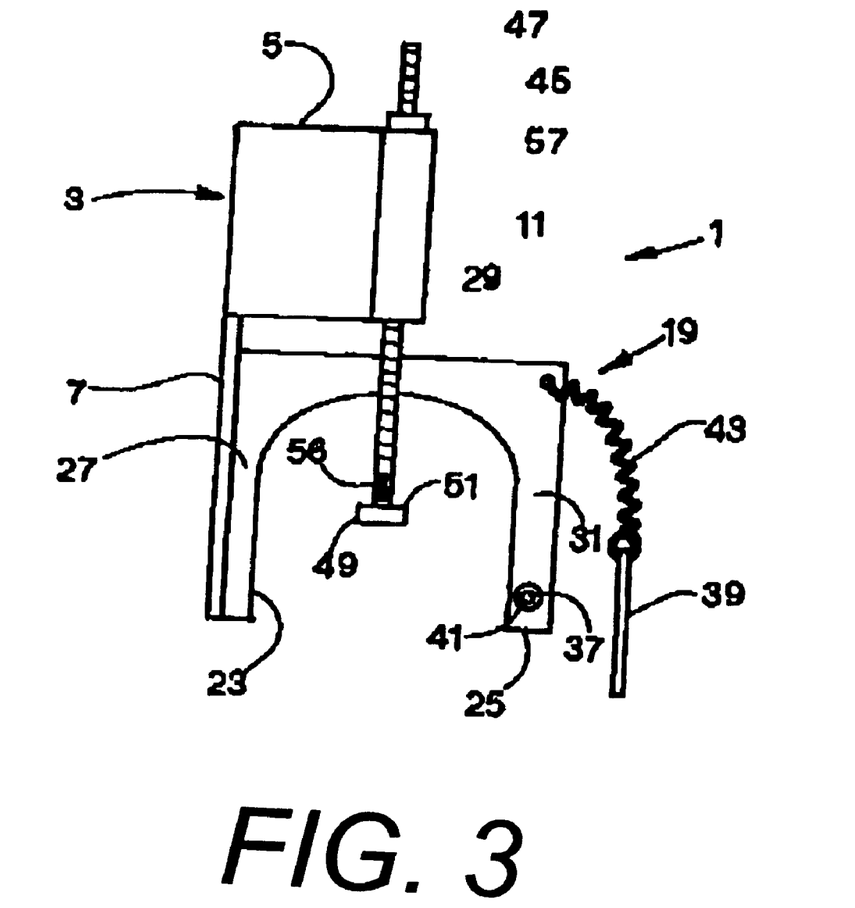
FIG. 3 is a front view of the static wire stringing apparatus.
Figure 4:
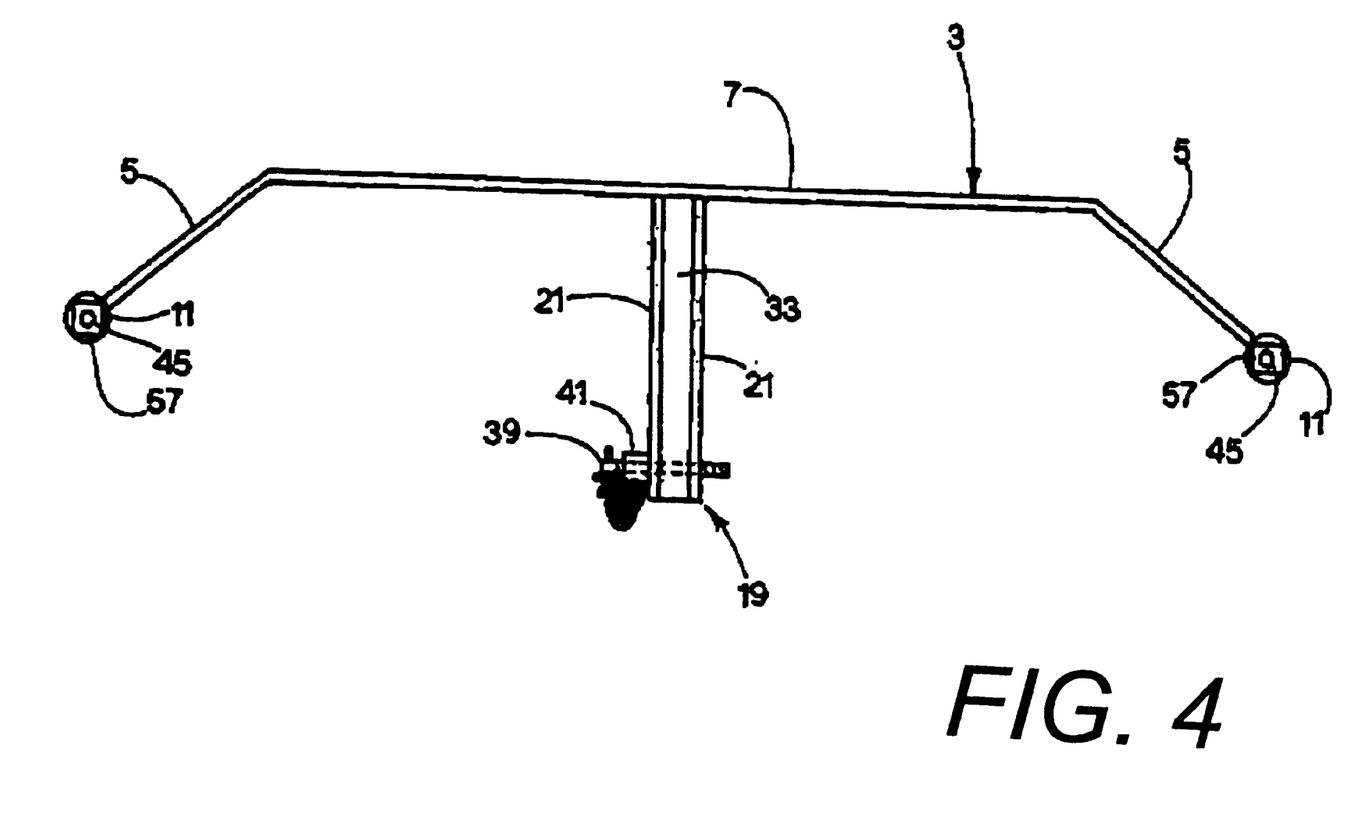
FIG. 4 is a top view of the static wire stringing apparatus.

The apparatus 1 is utilized to string a static line 101 and hold it in place until it can be fastened to a static bracket 103 mounted atop a utility pole 105. As shown in FIG. 1, the static bracket 103 is composed of a pair of upright legs 107, which are formed of steel angle stock and bolted to the pole 105, and a horizontal crossbar 109 which is formed of rectangular bar stock and bolted to the legs 107. The apparatus 1 is fastened to the static bracket 103 by lowering the apparatus 1 onto the crossbar 109 such that the crossbar 109 is received by the crossbar receiving slot 35 between the side plates 21. The latching pin 39 is then inserted through the pin receivers 37 of the side plates 21 to retain the apparatus 1 in place. A pair of standard stringing dollies 55, such as Sherman & Riley S-100 dollies, are attached to the flanges 51 on the lower ends 49 of the jackscrews 45.

A guide rope (not shown) is used to pull a free end of the static line 101 through the stringing dollies 55, and through the gap between the top of the pole 105 and the crossbar 109. The apparatus 1 holds the static line 101 in the proper position until after the strand of line 101 has been tensioned. The lineman then secures a shoe 111 to the static line 101 at a point proximate the crossbar 109. The distance between the dollies 55 is such that the lineman has ample room to work. A clevis 113 is provided for connecting the shoe 111 to the crossbar 109, the clevis 113 being already attached to the crossbar 109. By using the jack handle 61, the lineman can turn the jack nuts 57, and thereby raise the lower ends 49 of the jackscrews 45 and the attached static line 101 until the shoe 111 is aligned with the clevis 113. The lineman then inserts a pin 115 through aligned openings in the shoe 111 and clevis 113, completing the installation. To remove the apparatus 1, the lineman turns the jack nuts 57 in the opposite direction as before, causing the lower ends 49 of the jackscrews 45 to move downward until tension on the static line 6 is released. The static line 101 is then released from the stringing dollies 55, the latching pin 39 is withdrawn from the pin receivers 37, and the apparatus 1 is lifted off of the crossbar 109.

The apparatus 1 can also be used in the installation of the heavier gauge aluminum static wire used in fiber optic applications. These installations normally require the use of a stringing dolly having a diameter of 22 inches to prevent the aluminum static wire from bending at too sharp of an angle. By using two smaller stringing dollies 55 in spaced apart relation to each other, the apparatus 1 also serves to prevent the static wire from being bent at an excessively sharp angle, and actually provides a larger effective diameter since the distance between the opposing outside edges of the two dollies 55 may be considerably greater than 22 inches. The apparatus 1 has an additional advantage over a large diameter stringing dolly in that it is much lighter. The 22 inch diameter dolly weighs approximately 46 pounds, whereas the apparatus 1 with both S-100 dollies 55 attached can weigh approximately 25 to 28 pounds. The weight of a stringing apparatus is a significant consideration, as it may often have to be carried up a pole 105 by a lineman or even flown in using a helicopter.

It is to be understood that while certain forms of the present invention have been illustrated and described herein, it is not to be limited to the specific forms or arrangement of parts described and shown. For example, the apparatus 1 has been described herein as being formed by the welding together of steel plates, however, as would be appreciated by one skilled in the art, the apparatus 1 could easily be formed by other means, such as casting, and of other materials, such as aluminum alloy or high-strength plastics. It is also foreseen that the apparatus 1 could be constructed with only a single arm 5 and a single jackscrew 45, although it is preferred that a pair of such arms 5 and jackscrews 25 be employed. In addition, the crossbar retaining structure 19 could take many forms other than the preferred embodiment described herein. Any structure which securely hooks, clamps, or retains the apparatus 1 to the crossbar 109 in such an orientation that the arm distal ends 9 are aligned with a desired location for connecting the static wire 101 to the crossbar 109 is deemed to be within the scope of the present invention.

What is claimed and desired to be secured by Letters Patent is as follows:

1. A wire stringing apparatus for use when stringing a wire to a utility pole having a bracket connected thereto, the bracket including a pair of upright legs and a generally horizontal crossbar connected between the upright legs, the wire to be connected so as to depend from the crossbar between the upright legs, the apparatus to be used in conjunction with a standard stringing dolly, the apparatus comprising:

a) a body having a base portion and an arm extending from said base portion, said arm having a distal end;
b) a sleeve connected to said arm distal end, said sleeve having a generally horizontal upper surface and a generally vertical receiver;
c) a jackscrew slidably received by said sleeve receiver, said jackscrew having an upper end and a lower end, said lower end having a flange sized and shaped so as to be receivable by a coupler of a standard stringing dolly;
d) a nut threadably engaging said jackscrew and bearing against said sleeve upper surface; and
e) a crossbar retaining structure connected to said body base portion and securable to a crossbar of a utility pole bracket such that said arm distal end is in alignment with a desired location for connecting the wire to the crossbar.

2. The wire stringing apparatus as in claim 1, wherein said crossbar retaining structure comprises a pair of side plates held in spaced relation to one another such that a crossbar receiving slot is formed therebetween and a top piece at least partially closing an upper end of said crossbar receiving slot, said side plates being fixedly secured to said body base portion.

3. The wire stringing apparatus as in claim 2, wherein said crossbar retaining structure further includes a latching pin removably received by aligned receivers in said side plates, said receivers being oriented such that the bracket crossbar is selectively captured between said latching pin and said retaining structure top piece.

4. The wire stringing apparatus as in claim 1, wherein said crossbar retaining structure comprises a pair of side plates, each of said side plates having a aperture which extends upward from a bottom edge of said side plate to form an arch having a first leg, a cross piece, and a second leg, said side plates being held in spaced relation to one another by a top piece welded between said side plate cross pieces such that a crossbar receiving slot is formed between said side plates, said first legs of said side plates and a proximate end of said top piece being inserted into a slot formed in said body base portion, said slot extending upward from a bottom edge of said body base portion, said side plate first legs and said top piece proximate end being fixedly secured within said slot such that said retaining structure extends outward from, and generally at a right angle to said body base portion.

5. The wire stringing apparatus as in claim 4, wherein said arm is angled such that said sleeve receiver is generally aligned with said side plate apertures.

6. The wire stringing apparatus as in claim 4, wherein said crossbar retaining structure further includes a latching pin removably received by aligned receivers in said side plate second legs, said receivers being oriented such that the bracket crossbar is selectively captured between said latching pin and said retaining structure top piece.

7. The wire stringing apparatus as in claim 1 and further including a jack handle having a socket sized and shaped to engage said nut and an elongate bar connected to said socket, said jack handle being adapted for use in turning said nut and thereby selectively raising or lowering said jackscrew lower end.

8. The wire stringing apparatus as in claim 1, wherein said jackscrew is prevented from turning relative to said sleeve by a key, said key being received by generally vertical keyways in said jackscrew and said sleeve.

9. The wire stringing apparatus as in claim 1 and further including a jackscrew stop connected to said jackscrew upper end and preventing said nut from being inadvertently unscrewed from said jackscrew.

10. The wire stringing apparatus as in claim 9 wherein said jackscrew has an outer diameter and said jackscrew stop comprises a retaining washer secured to said jackscrew upper end by a threaded fastener, said threaded fastener being received by an axial receiver formed in said jackscrew upper end, said retaining washer having an outside diameter greater than or equal to the outer diameter of said jackscrew.

11. The wire stringing apparatus as in claim 1 and further including a nut lock for selectively preventing said nut from turning.

12. The wire stringing apparatus as in claim 11, wherein said nut lock comprises a locking member having first and second ends, said locking member being pivotally connected to said arm at said first end and pivotable between a locked position and a released position, said second end having a notch, said notch engaging said nut and preventing said nut from turning when said locking member is in said locked position.

13. A wire stringing apparatus for use when stringing a wire to a utility pole having a bracket connected thereto, the bracket including a pair of upright legs and a generally horizontal crossbar connected between the upright legs, the wire to be connected so as to depend from the crossbar between the upright legs, the apparatus to be used in conjunction with standard stringing dollies, the apparatus comprising:

a) a body having a base portion and a pair of arms extending from said base portion in generally opposing directions, each said arm having a distal end;

b) a pair of sleeves, each said sleeve being connected to a respective one of said arm distal ends and having a generally horizontal upper surface and a generally vertical receiver;

c) a pair of jackscrews, each said jackscrew being slidably received by a respective one of said sleeve receivers and having an upper end and a lower end, each said lower end having a flange sized and shaped so as to be receivable by a coupler of a standard stringing dolly;

d) a pair of nuts, each said nut threadably engaging a respective one of said jackscrews and bearing against the respective sleeve upper surface; and e) a crossbar retaining structure connected to said body base portion and securable to a crossbar of a utility pole bracket such that said arm distal ends are in alignment with a desired location for connecting the wire to the crossbar.

14. The wire stringing apparatus as in claim 13, wherein said crossbar retaining structure comprises a pair of side plates held in spaced relation to one another such that a crossbar receiving slot is formed therebetween and a top piece at least partially closing an upper end of said crossbar receiving slot, said side plates being fixedly secured to said body base portion.

15. The wire stringing apparatus as in claim 14, wherein said crossbar retaining structure further includes a latching pin removably received by aligned receivers in said side plates, said receivers being oriented such that the bracket crossbar is selectively captured between said latching pin and said retaining structure top piece.

16. The wire stringing apparatus as in claim 13, wherein said crossbar retaining structure comprises a pair of side plates, each of said side plates having a aperture which extends upward from a bottom edge of said side plate to form an arch having a first leg, a cross piece, and a second leg, said side plates being held in spaced relation to one another by a top piece welded between said side plate cross pieces such that a crossbar receiving slot is formed between said side plates, said first legs of said side plates and a proximate end of said top piece being inserted into a slot formed in said body base portion, said slot extending upward from a bottom edge of said body base portion, said side plate first legs and said top piece proximate end being fixedly secured within said slot such that said retaining structure extends outward from, and generally at a right angle to said body base portion.

17. The wire stringing apparatus as in claim 16, wherein each said arm is angled such that said sleeve receivers are generally aligned with said side plate apertures.

18. The wire stringing apparatus as in claim 16, wherein said crossbar retaining structure further includes a latching pin removably received by aligned receivers in said side plate second legs, said receivers being oriented such that the bracket crossbar is selectively captured between said latching pin and said retaining structure top piece.

19. The wire stringing apparatus as in claim 13 and further including a jack handle having a socket sized and shaped to engage said nuts and an elongate bar connected to said socket, said jack handle being adapted for use in turning said nuts and thereby selectively raising or lowering said jackscrew lower ends.

20. The wire stringing apparatus as in claim 13, wherein each said jackscrew is prevented from turning relative to its respective sleeve by a key, said key being received by generally vertical keyways in said jackscrew and said respective sleeve.

21. The wire stringing apparatus as in claim 13 and further including a jackscrew stop connected to each said jackscrew upper end and preventing the respective nut from being inadvertently unscrewed from the respective jackscrew.

22. The wire stringing apparatus as in claim 21 wherein each said jackscrew has an outer diameter and each said jackscrew stop comprises a retaining washer secured to the respective jackscrew upper end by a threaded fastener, each said threaded fastener being received by an axial receiver formed in the respective jackscrew upper end, each said retaining washer having an outside diameter greater than or equal to the outer diameter of the respective jackscrew.

23. The wire stringing apparatus as in claim 13 wherein each said nut has a respective nut lock for selectively preventing said nut from turning.

24. The wire stringing apparatus as in claim 23, wherein each said nut lock comprises a locking member having first and second ends, each said locking member being pivotally connected to the respective arm at said first end and pivotable between a locked position and a released position, each said second end having a notch, said notch engaging the respective nut and preventing said respective nut from turning when said locking member is in said locked position.

* * * * *